(12) United States Patent
Sa et al.

(10) Patent No.: US 8,350,217 B2
(45) Date of Patent: Jan. 8, 2013

(54) PIXEL, PIXEL ARRAY, AND IMAGE SENSOR INCLUDING THE PIXEL ARRAY

(75) Inventors: Seung Hoon Sa, Seoul (KR); Andrew Kunil Choe, Seoul (KR); Cheong Yong Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 5 days.

(21) Appl. No.: 13/097,752

(22) Filed: Apr. 29, 2011

(65) Prior Publication Data

US 2012/0256090 A1  Oct. 11, 2012

(30) Foreign Application Priority Data

Apr. 11, 2011  (KR) .................. 10-2011-0033468

(51) Int. Cl.
*G01J 5/02* (2006.01)
(52) U.S. Cl. ........................................... 250/349
(58) Field of Classification Search ............ 250/349, 250/336.1–336.2, 338.1–338.5, 339.01–339.15
See application file for complete search history.

(56) References Cited

U.S. PATENT DOCUMENTS

| | | | |
|---|---|---|---|
| 2006/0114551 A1* | 6/2006 | Okada et al. | 359/350 |
| 2006/0124833 A1* | 6/2006 | Toda | 250/214 R |
| 2009/0278048 A1 | 11/2009 | Choe et al. | |

FOREIGN PATENT DOCUMENTS

KR  10-2009-0117437 A  11/2009

OTHER PUBLICATIONS

Office Action dated Jun. 20, 2012 in Korean Application No. 10-2011-0033468, filed Apr. 11, 2011.

* cited by examiner

*Primary Examiner* — Kiho Kim
(74) *Attorney, Agent, or Firm* — Saliswanchik, Lloyd & Eisenschenk

(57) ABSTRACT

Disclosed are a pixel, a pixel array, and an image sensor including the pixel array. The pixel includes a first photo-sensing unit to detect a visible light and an IR, and a second photo-sensing unit provided at one side of the first photo-sensing unit to detect a light in which the IR is blocked.

6 Claims, 3 Drawing Sheets

PIXEL, PIXEL ARRAY, AND IMAGE SENSOR INCLUDING THE PIXEL ARRAY

CROSS-REFERENCE TO RELATED APPLICATION

This application claims the benefit under 35 U.S. §119 of Korean Patent Application No. 10-2011-0033468, filed on Apr. 11, 2011, which is hereby incorporated by reference in its entirety.

BACKGROUND

The embodiment relates to a pixel, a pixel array, and an image sensor including the pixel array.

An image sensor is a photoelectric conversion device to realize an image by using lights.

Meanwhile, in the case of a present image sensor including a silicon substrate, since lights having both of a visible band and an IR band are absorbed, mixed image signals are produced so that it is difficult to precisely process the images.

According to the related art, in order to precisely process the image, an IR cut filter has been used to transmit only lights having a visible band onto pixels while blocking lights having an IR band. However, the IR cut filter must be separately provided as a component of a camera module.

In addition, according to the related art, there is a scheme to use only RGB signals having the visible band or the IR band by providing a predetermined layer capable of transmitting only lights having the IR band around RGB color filter layers. However, a process of forming the layer transmitting lights having only the IR band may not be suitable for a current semiconductor manufacturing process.

In addition, according to the related art, there is a scheme to classify the mixed signal output from RGB pixels into visible band image signals and IR band image signals after supplying lights having the visible band and the IR band to the image sensor. However, since a complex function of an image signal processor must be used, the improvement of the above scheme is required.

BRIEF SUMMARY

The embodiment provides a pixel, a pixel array, and an image sensor including the pixel array, capable of independently processing signals having a visible band and an IR band.

According to the embodiment, there is provided a pixel including a first photo-sensing unit to detect a visible light and an IR (Infra Red), and a second photo-sensing unit provided at one side of the first photo-sensing unit to detect a light in which an IR is blocked.

In addition, according to the embodiment, there is provided a pixel array including pixels provided in the form of an array.

In addition, according to the embodiment, there is provided an image sensor including a pixel array including pixels provided in the form of an array.

As described above, according to the embodiment, the pixel, the pixel array, and the image sensor including the pixel array, which can independently process signals having a visible band and an IR band, can be provided.

For example, according to the embodiment, an IR cut filter used in a related art is not required. Both of a pixel, in which only visible lights can be signal-processed by using a light absorption characteristic of silicon, and a pixel, in which both of visible lights and lights having an IR band can be processed, are provided, thereby providing a pixel, a pixel array, and an image sensor including the pixel array, capable of independently and effectively processing signals having a visible band and an IR band.

In addition, the embodiment can be applied to application ranges from an image processing application field using only lights having a visible band to an NIR IR sensing application field.

DETAILED DESCRIPTION

Figure 1:
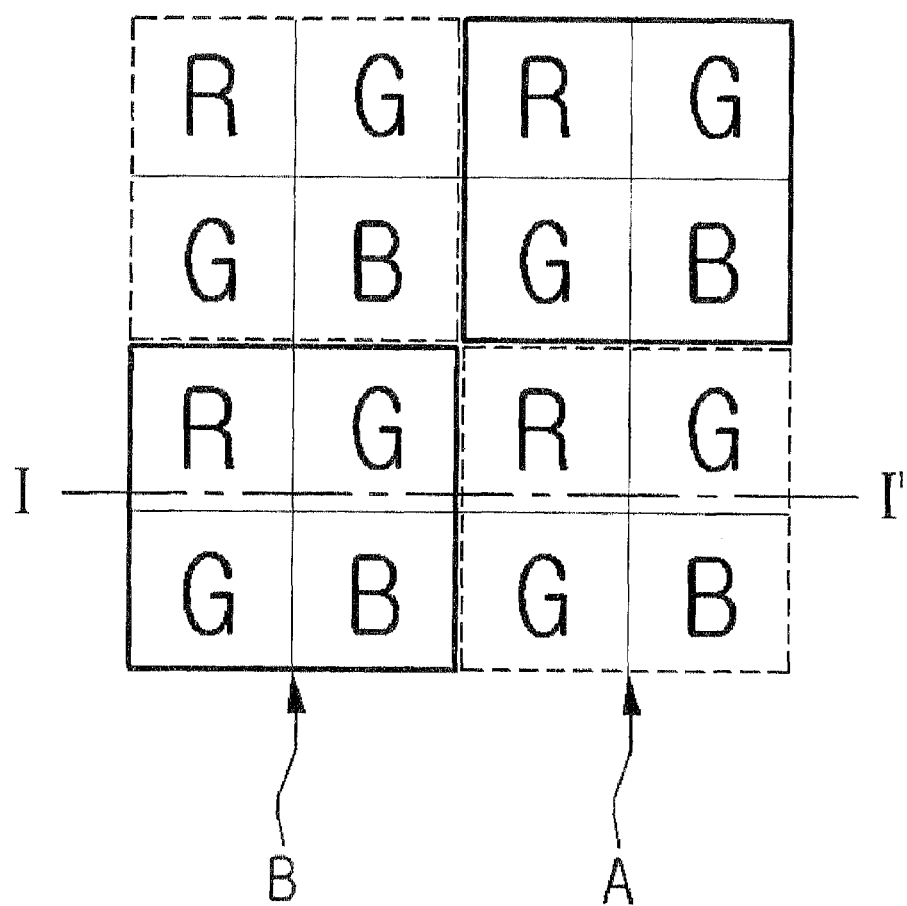
FIG. 1 is a plan view showing a pixel array according to the embodiment.

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

The thickness and size of each layer shown in the drawings may be exaggerated, omitted or schematically drawn for the purpose of convenience or clarity. In addition, the size of elements does not utterly reflect an actual size.

Figure 2:
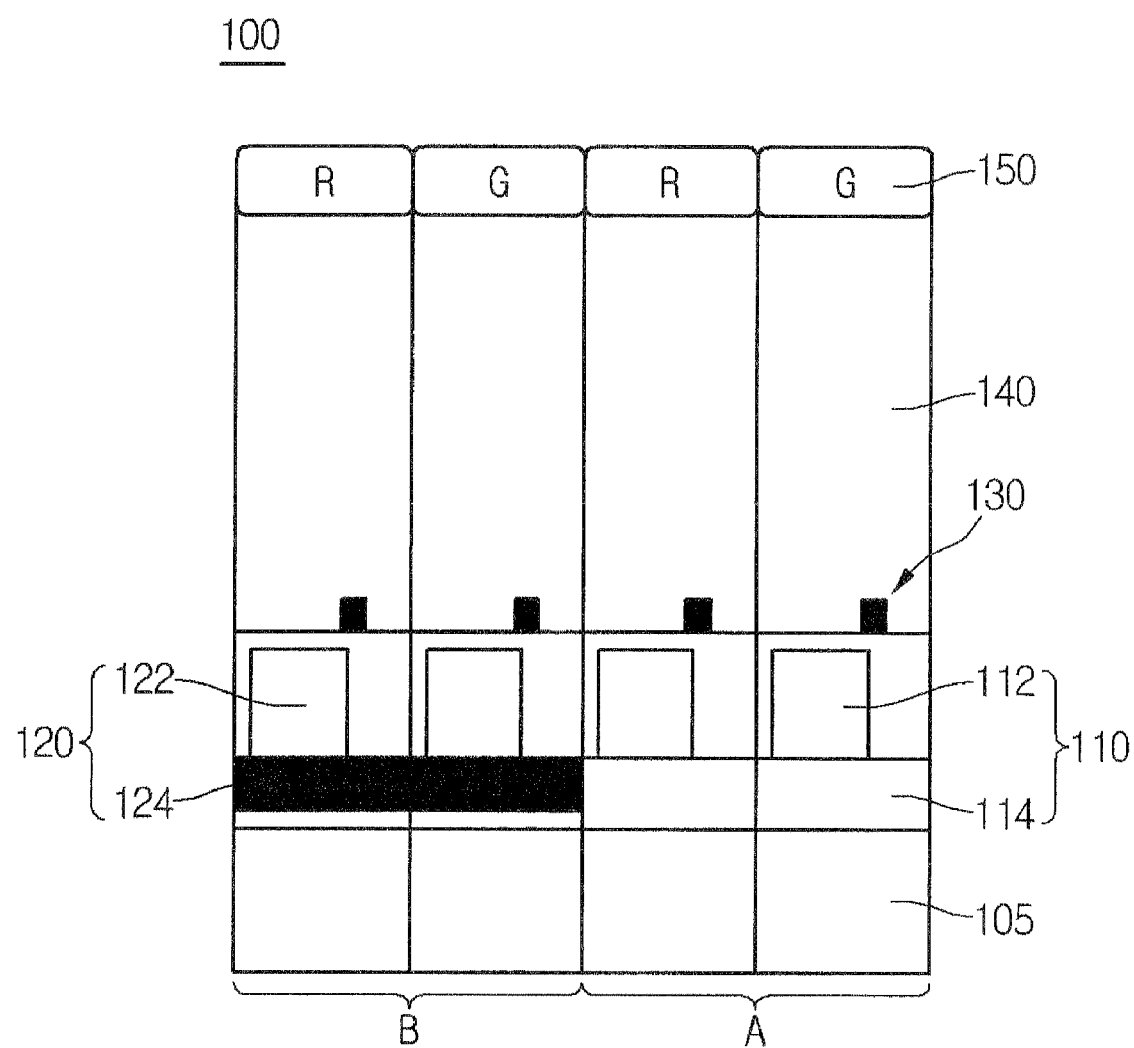
FIG. 2 is a sectional view showing the pixel array according to the embodiment.

FIG. 1 is a plan view showing a pixel array 100 according to the embodiment, and FIG. 2 is a sectional view taken along line I-I' in the pixel array 100 according to the embodiment.

Figure 3:
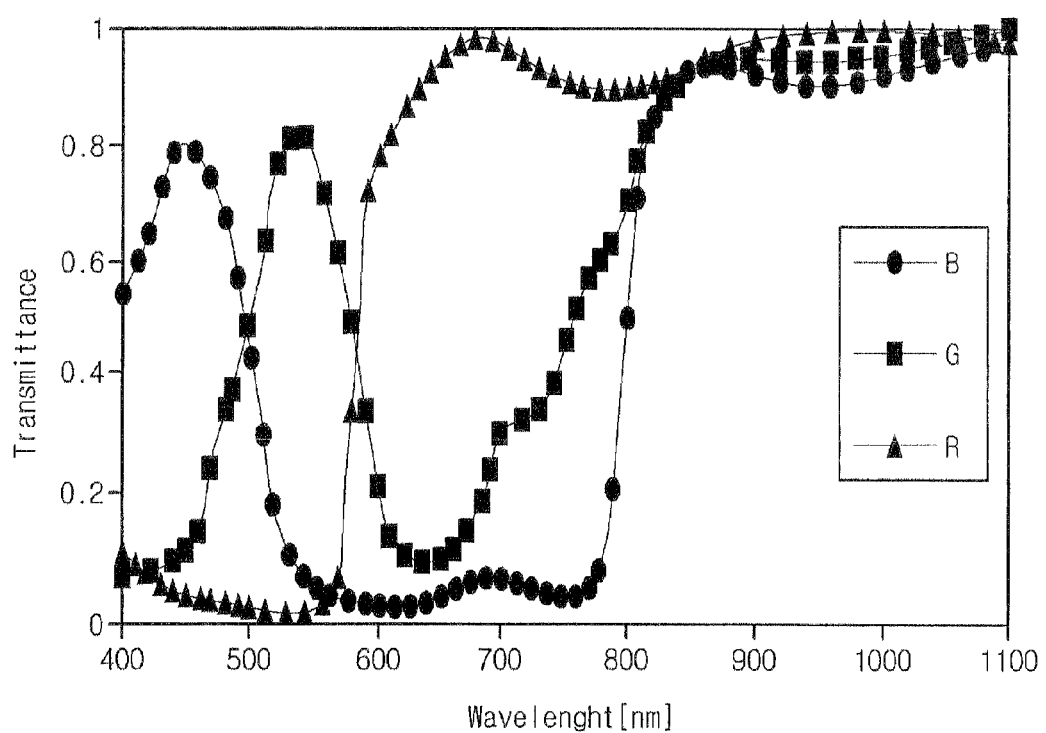
FIG. 3 is a graph showing the characteristics of color filters representing the transmittance of lights having the visible band and an NIR (near infrared ray) IR band.

FIG. 3 is a graph showing the characteristics of color filters representing the transmittance of lights having the visible band and an NIR (near infrared ray) IR band.

For example, a blue color represents high light transmittance in a visible band around a wavelength of about 450 nm and an NIR IR band of a wavelength of at least 800 nm. A green color represents high light transmittance in a visible band around a wavelength of about 530 nm and the NIR IR band of a wavelength of at least 800 nm. A red color represents high light transmittance in a visible band around a wavelength of about 600 nm and the NIR IR band of a wavelength of at least 800 nm.

The pixel array 100 according to the embodiment or an image sensor including the pixel array 100 according to the embodiment may include a first photo-sensing unit 110 to detect a visible light or an IR (Infra Red) light and a second photo-sensing unit 120 provided at one side of the first photo-sensing unit 110 to detect a light in which an IR is blocked.

The first photo-sensing unit 110 may correspond to a first pixel region A to detect both of the visible light and the IR, and the second photo-sensing unit 120 may correspond to a second pixel region B to detect the light in which the IR is blocked, for example, only the visible light.

For example, the first photo-sensing unit 110 may include a first visible light sensing unit 112 to detect a visible light and a first IR sensing unit 114 provided under the first visible light sensing unit 112 to detect an IR.

In addition, the second photo-sensing unit 120 may include a second visible light sensing unit 122 to detect a visible light and an IR blocking unit 124 provided under the second visible light sensing unit 122 to block an IR.

According to the embodiment, as shown in FIGS. 1 and 2, the IR blocking unit 124 may be formed in a unit pixel, but the embodiment is not limited thereto. For example, various IR blocking units 124 may be provided in the unit pixel to block the lights having various colors.

According to the embodiment, signals having the visible band can be independently distinguished from signals having the IR band due to a signal difference between the first and second photo-sensing units 110 and 120.

For example, according to the embodiment, in order to expand application ranges from an image processing application field using only lights having a visible band to an NIR IR sensing application field, an IR cut filter used in related arts is not required. In addition, both of a pixel, in which only visible lights can be signal-processed by using a light absorption characteristic of silicon, and a pixel, in which both of visible lights and lights having an IR band can be processed, are provided, thereby providing a pixel, a pixel array, and an image sensor including the pixel array, capable of independently and effectively processing signals having a visible band and an IR band.

Hereinafter, a method for manufacturing the pixel, the pixel array, and the image sensor including the pixel array according to the embodiment will be described with reference to FIG. 2.

First, the first photo-sensing unit 110, which detects both the visible light and the IR, and the second photo-sensing unit 120 provided at one side of the first photo-sensing unit 110 to detect only the visible light are formed on a substrate 105.

The substrate 105 may include a silicon substrate, but the embodiment is not limited thereto. For example, the substrate 105 may include a material to make a difference in a transmission depth between a visible light and an IR.

The pixel region A to detect both of the visible light and the IR and the second pixel region B to detect only the visible light are formed on the substrate 105.

The first pixel region A may include the first photo-sensing unit 110, and the second pixel region B may include the second photo-sensing unit 110.

According to the embodiment, the first photo-sensing unit 110 may include the first visible light sensing unit 112 to detect a visible light and the first IR sensing unit 114 provided under the first visible light sensing unit 112 to detect an IR.

The first visible light sensing unit 112 and the first IR sensing unit 114 may be formed by implanting ions into the substrate 105 or may be formed in the process of forming a doped epitaxial layer. For example, the first photo-sensing unit 110 may be formed by implanting N-type ions into the substrate 105 or may be formed by forming an epitaxial layer doped with N-type ions.

The second photo-sensing unit 120 may include the second visible light sensing unit 122 to detect a visible light and the IR blocking unit 124 provided under the second visible light sensing unit 122 to block an IR.

The IR blocking unit 124 may be formed by implanting ions into the substrate 105, may be formed through the process of forming a doped epitaxial layer, or may be formed by using a photonic crystal, but the embodiment is not limited thereto.

According to the embodiment, as shown in FIGS. 1 and 2, the IR blocking unit 124 may be formed in a unit pixel, but the embodiment is not limited thereto. For example, various IR blocking units 124 may be provided in the unit pixel to block the lights having various colors.

According to the embodiment, signals having the visible band are independently distinguished from signals having the IR band due to a signal difference between the first and second photo-sensing units 110 and 120.

For example, according to the embodiment, in order to expand application ranges from an image processing application field using only a light having a visible band to an NIR IR sensing application field, an IR cut filter used in related arts is not required. Both of a pixel, in which only visible lights can be signal-processed by using a light absorption characteristic of silicon, and a pixel, in which both of visible lights and lights having an IR band can be processed, are provided, thereby providing the pixel, the pixel array, and the image sensor including the pixel array, capable of independently and effectively processing signals having a visible band and an IR band.

A transistor 130 is provided at one side of the first photo-sensing unit 112 or the second photo-sensing unit 122. According to the manufacturing process, after the transistor 130 has been formed, the first visible light sensing unit 112 or the second visible light sensing unit 122 may be formed, but the embodiment is not limited thereto.

An interlayer dielectric layer 140 is formed on the substrate 105 having the transistor 130, and color filter layers 150 are formed on the interlayer dielectric layer 140 corresponding to photo-sensing units according to colors.

For example, according to the embodiment, in order to expand application ranges from an image processing application field using only a light having a visible band to an NIR IR sensing application field, an IR cut filter used in related arts is not required. Both of a pixel, in which only visible lights can be signal-processed by using a light absorption characteristic of silicon, and a pixel, in which both of visible lights and lights having an IR band can be processed, are provided, thereby providing the pixel, the pixel array, and the image sensor including the pixel array, capable of independently and effectively processing signals having a visible band and an IR band.

Therefore, the embodiment provides the pixel, the pixel array, and the image sensor including the pixel array, capable of independently processing signals having a visible band and an IR band.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A pixel comprising:

a first photo-sensing unit to detect a visible light and an IR; and a second photo-sensing unit provided at one side of the first photo-sensing unit to detect a light in which the IR is blocked, wherein the first photo-sensing unit comprises:

a first visible light sensing unit to detect the visible light; and a first IR sensing unit to detect the IR between the first visible light sensing unit and a substrate, and wherein the second photo-sensing unit comprises:

a second visible light sensing unit to detect the visible light; and an IR blocking unit to block the IR between the second visible light sensing unit and the substrate.

2. The pixel of claim 1, wherein a signal having a visible band is independently distinguishable from a signal having an IR band due to a signal difference between the first and second photo-sensing units.

3. A pixel array having the pixel claimed in claim 2.

4. An image sensor comprising a pixel array, wherein the pixel array comprises the pixel claimed in claim 2.

5. A pixel array having the pixel claimed in claim 1.

6. An image sensor comprising a pixel array, wherein the pixel array comprises the pixel claimed in claim 1.

* * * * *